US 7,142,732 B2

(12) United States Patent
Bamford et al.

(10) Patent No.: US 7,142,732 B2
(45) Date of Patent: Nov. 28, 2006

(54) UNSUPERVISED SCENE SEGMENTATION

(75) Inventors: Pascal Bamford, Bardon (AU); Paul Jackway, Toowong (AU)

(73) Assignee: Co-Operative Research Centre for Sensor Signal and information Processing, Mawson Lakes ( * ) Notice: Subject to any disclaimer, the term of this patent is extended or adjusted under 35 U.S.C. 154(b) by 808 days.

(21) Appl. No.: 10/312,508

(22) PCT Filed: Jun. 28, 2001

(86) PCT No.: PCT/AU01/00787

§ 371 (c)(1),
(2), (4) Date: Feb. 6, 2003

(87) PCT Pub. No.: WO02/03331

PCT Pub. Date: Jan. 10, 2002

(65) Prior Publication Data

US 2003/0169946 A1    Sep. 11, 2003

(30) Foreign Application Priority Data

Jun. 30, 2000   (AU) .................................... PQ8492

(51) Int. Cl.
*G06K 9/00* (2006.01)
(52) U.S. Cl. ...................... 382/308; 382/257
(58) Field of Classification Search ................ 382/308, 382/256, 257, 291
See application file for complete search history.

(56) References Cited

U.S. PATENT DOCUMENTS

| | | | | |
|---|---|---|---|---|
| 5,257,182 A * | 10/1993 | Luck et al. | ................. | 382/224 |
| 5,768,407 A * | 6/1998 | Shen et al. | ................. | 382/133 |
| 5,850,464 A * | 12/1998 | Vogt | ........................... | 382/128 |
| 5,892,841 A * | 4/1999 | Jochems et al. | ............ | 382/152 |
| 6,195,659 B1 * | 2/2001 | Hyatt | ............................. | 707/7 |
| 6,244,764 B1 * | 6/2001 | Lei et al. | ..................... | 400/103 |
| 6,363,161 B1 * | 3/2002 | Laumeyer et al. | .......... | 382/104 |
| 6,400,831 B1 * | 6/2002 | Lee et al. | ................... | 382/103 |
| 6,625,315 B1 * | 9/2003 | Laumeyer et al. | .......... | 382/190 |

OTHER PUBLICATIONS

P.T. Jackway, *Improved Morphological Top-Hat*, Electronics Letters, vol. 36(4), Jul. 2000, pp. 1194-1195, Institution of Electrical Engineers.
Qian et al., *Automatic Extraction of Coronary Artery Tree on Coronary Angiograms by Morphological Operators*, Computers in Cardiology, vol. 25, 1998, pp. 765-768, IEEE.

* cited by examiner

*Primary Examiner*—Sanjiv Shah
(74) *Attorney, Agent, or Firm*—Workman Nydegger

(57) ABSTRACT

A method of segmenting objects in an image is described. The method applies a Top Hat algorithm to the image then constructs inner and outer markers for application to the original image in a Watershed algorithm. The inner marker is constructed using binary erosion. The outer marker is constructed using binary dilation and perimeterisation. The method finds particular application for first level segmentation of a cell nucleus prior to detailed analysis.

9 Claims, 14 Drawing Sheets

FIG 2

UNSUPERVISED SCENE SEGMENTATION

This invention relates to an improved method of segmenting objects in an image. In particular, although not exclusively, it relates to a method of transforming an image using Top Hat and Watershed transforms for scene segmentation of an image into regions-of-interest.

BACKGROUND TO THE INVENTION

In computer image analysis, a common task is the selection of objects-of-interest in a captured image. For example, in computer automated cytology, a typical task is the selection, or segmentation, of cell nuclei from an image containing many cells. This task is often separated into two sub-tasks.

The first sub-task is that of scene segmentation. In this sub-task, the original image is coarsely segmented into regions-of-interest, each containing a single cell-nucleus-of-interest. Each region-of-interest may then be viewed as a new, smaller image to process.

The second sub-task may consist of further segmentation of the cell-nucleus-of-interest within each region-of-interest. The second sub-task is the subject of co-pending PCT Patent Application number PCT/AU99/00231 claiming priority from Australian Provisional Patent Application number PP2786 dated 3 Apr. 1998. The Patent Application is entitled Method of Unsupervised Cell Nuclei Segmentation and describes a method of active contours using a Viterbi search algorithm for unsupervised segmentation of cell nuclei.

The first sub-task of scene segmentation operates on an image containing between zero and many objects-of-interest. The method of the present invention is for the implementation of scene segmentation.

Various techniques exist for identifying and segmenting objects in an image. One method of scene segmentation is described by Betel et al [Segmentation and numerical analysis of microcalcifications on mammograms using mathematical morphology; British Journal of Radiology; vol. 70; no. 837; September 1997, pp 903–17], which discloses the use of simple Top Hat and Watershed algorithms of mathematical morphology to automatically detect and segment microcalcifications on digitized mammograms. The Betel process is of limited use in cell nuclei segmentation due to insufficient noise immunity and region-growing constraints.

OBJECT OF THE INVENTION

It is an object of the present invention to provide an improved method of image scene segmentation.

It is a further object of the invention to provide an improved method of segmenting an image scene into regions-of-interest containing cell nuclei for subsequent determination of nuclei characteristics. Other objects will be evident from the following discussion.

SUMMARY OF THE INVENTION

In one form, although it need not be the only, or indeed the broadest, form, the invention resides in an improved method of scene segmentation including the steps of:
(i) transforming an input image by a Top Hat operator;
(ii) conducting erosion on said Top Hat transformed image to produce an inner marker image;
(iii) eliminating objects less than an object-of-interest size by reconstructing said Top Hat transformed image with said inner marker image to produce a reconstructed image;
(iv) conducting dilation on said reconstructed image to produce an outer marker image;
(v) determining a perimeter of said outer marker image; and
(vi) transforming said input image using said inner marker image and said perimeterised outer marker image by a Watershed operator to produce a segmented image.

In preference, the method may further include the step of delineating a region-of-interest around each segmented object to produce region-of-interest images.

Prior to the Top Hat transformation step, the method preferably includes the step of down-sampling the input image by a factor N to produce a smaller image.

After said erosion and dilation steps, the method preferably includes the step of up-sampling the eroded and dilated images by a factor of N.

Any suitable value of N may be used. The up-sampling step suitably uses the same factor of N such that the inner and outer marker images are the same size as that of the input image.

BRIEF DESCRIPTION OF THE DRAWINGS

Preferred embodiments of the invention will now be described with reference to the following drawings, in which:

FIG. 2 shows the input image A before down-sampling and the image A' after down-sampling;

FIG. 14 shows the ROI images which are the result of applying object extraction to image W.

DETAILED DESCRIPTION OF THE PREFERRED EMBODIMENT

Figure 1:
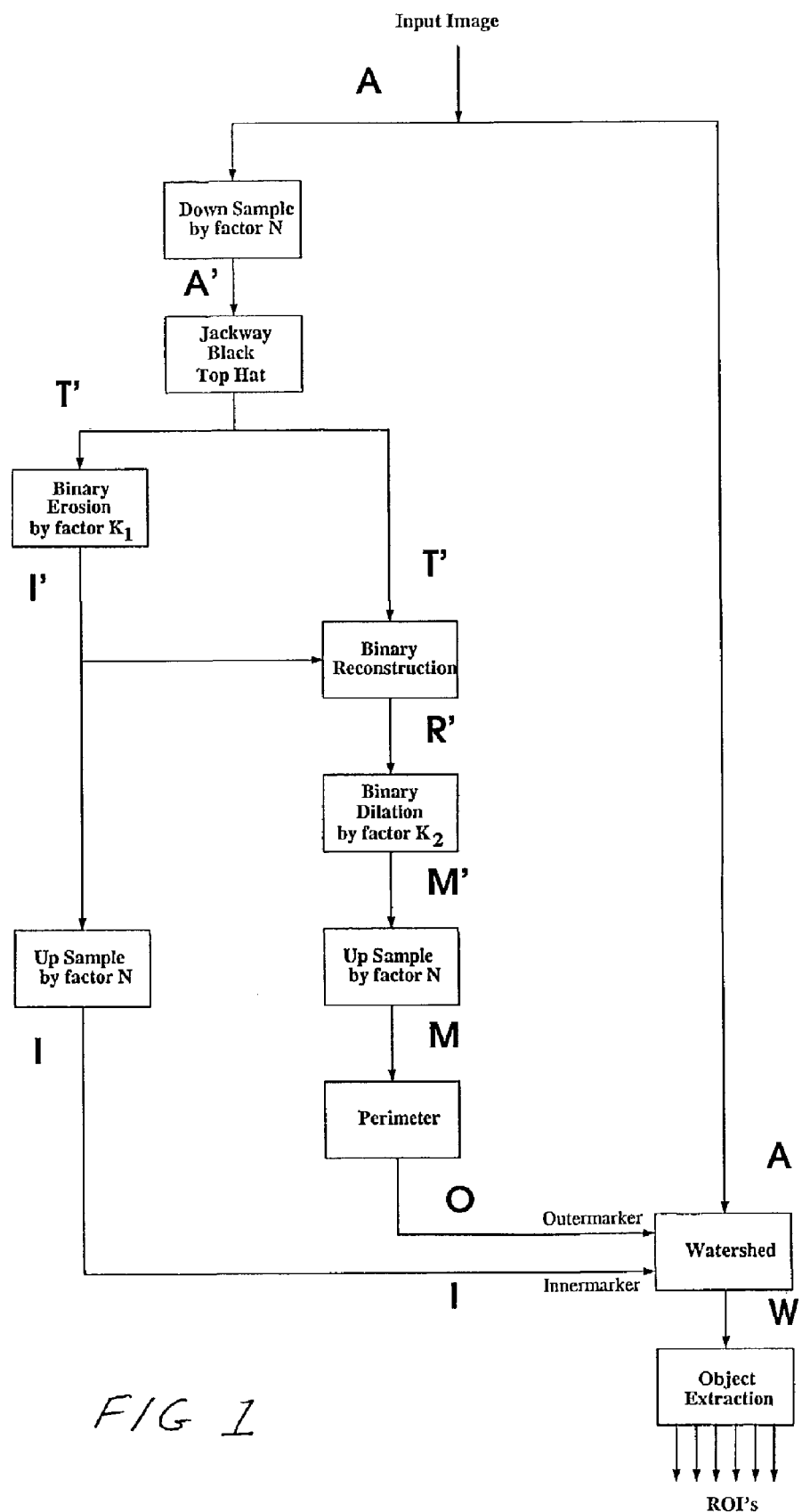
FIG. 1 is a flow chart showing the steps in the invention.

FIG. 1 shows a flow chart of the steps involved in the scene segmentation process. The image produced after each step is indicated by a letter shown in bold. The bold letters are referred to throughout the description and may be cross-referenced with FIG. 1.

The first step in the segmentation process may be to down-sample an input scene image A to a smaller image A'. This is shown in FIG. 2. This may be achieved with the use of, for example, quadtree decomposition, although it is envisaged that alternative down-sampling methods could be used.

The factor by which the input image is down-sampled, N, may depend on the size and resolution of the input image. The magnification of the input image may also affect the extent to which the input image may be down-sampled. If N takes a value of 2, a 4 pixel by 4 pixel image is down-sampled to 1 pixel. N may take a value of unity, in which case the down-sampling process has no effect on the size of the input image. The method of the present invention may be carried out without changing the size of the input image. Wilson and Spann (Image Segmentation and Uncertainty, Wiley 1988), assuming circular image objects of radius $2^r$, calculated an optimum value for N as $N=r-1$.

However, one benefit of down-sampling the input image is the reduction of processing time due to the resultant smaller image containing fewer pixels. Another benefit is the reduction of noise, which is smoothed during the down-sampling process. Thus, contrast in the down-sampled image is better than in the original input image.

The following block of pseudo-code achieves a suitable down-sampling:

```
Block: "Down Sample by factor N"
Inputs: Image A, factor N
Output: Image A'
Algorithm:
NewImage = Image A
FOR steps 1 TO N
    OldImage = NewImage
    NewImage = size(X_size(OldImage)/2, Y_size(OldImage)/2)
    FOR each Pixel in NewImage
        Pixel NewImage_{X,Y} =
            (OldImage_{2X,2Y} + OldImage_{2X,2Y+1} + OldImage_{2X+1,2Y} +
            OldImage_{2X+1,2Y+1})/4
    ENDFOR
ENDFOR
RETURN Image A' = NewImage
```

The down-sampled image is then subjected to a Top Hat transform, such as the Jackway Top Hat transform, $H = f - ((f \oplus (B_{do} \backslash B_{di})) \ominus B_{di})$, where f is the original image, $B_{do}$ and $B_{di}$ are outer and inner structuring elements respectively, $\oplus$, $\ominus$ and \ are the standard morphological operators of dilation, erosion and set difference respectively. The intermediate image, H, is finally thresholded by a value T to result in the Top Hat image by $Th = 1$ if $H \geq T$;

$Th = 0$ if $H < T$ where Th is the Top Hat image. The Jackway Top Hat transform is described in detail in Electronics Letters, Vol 36, No 14, pg 1194–5. Other possible Top Hat transforms are referred to in the Electronics Letters paper.

Figure 3:
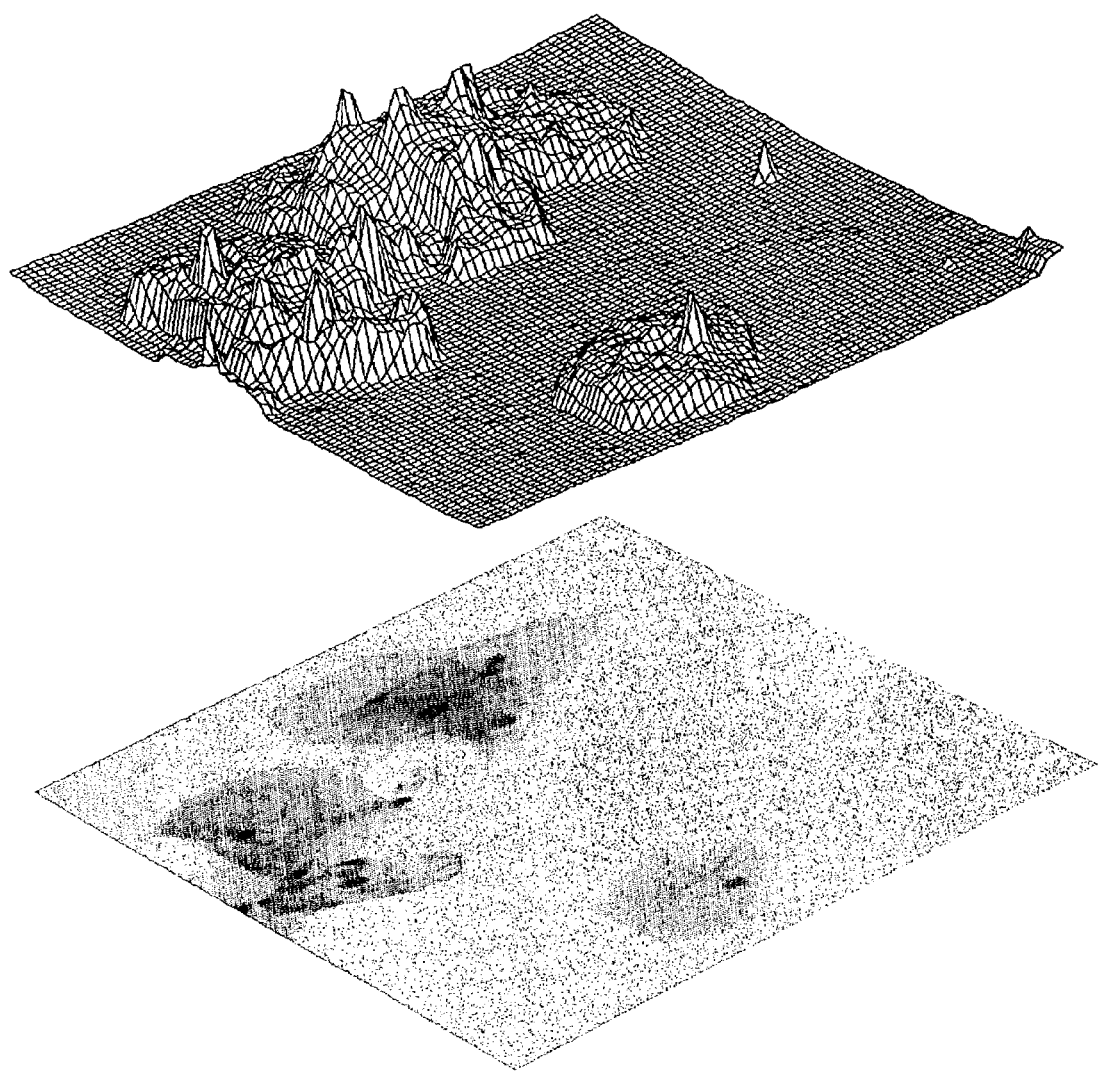
FIG. 3 shows the treatment of an image as a landscape.

Referring to FIG. 3, the down-sampled gray-scale image A' (bottom image in FIG. 3), is treated as a landscape (top image in FIG. 3), in which higher altitude levels represent darker pixels in the gray-scale image and lower altitude levels represent lighter pixels.

Figure 4:
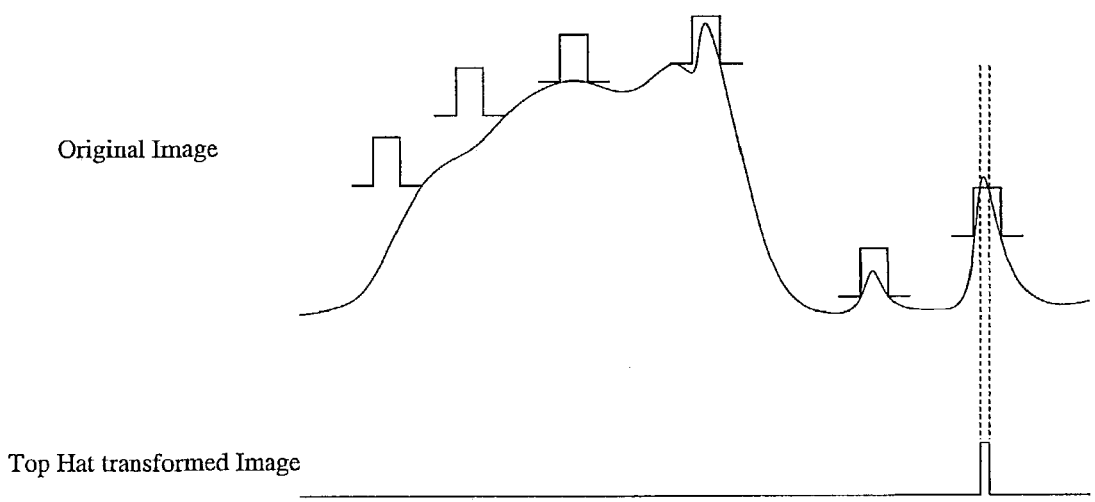
FIG. 4 shows the Jackway Top Hat transform of a signal.

The Top Hat transform works by passing a three-dimensional shape, that of a top hat shape, over a three-dimensional landscape. The rim of the top hat is placed at every location of the landscape such that it rests on the highest part of the landscape underneath the top hat. The top hat maintains the same attitude, i.e. it cannot rest on two different levels and be at a slant. If a part of the image landscape penetrates the top of the top hat, that part of the image becomes labelled in the transformed image. If the top hat is not penetrated by a particular part of the image, that part is not labelled in the transformed image. This is illustrated in two dimensions in FIG. 4.

Figure 5:
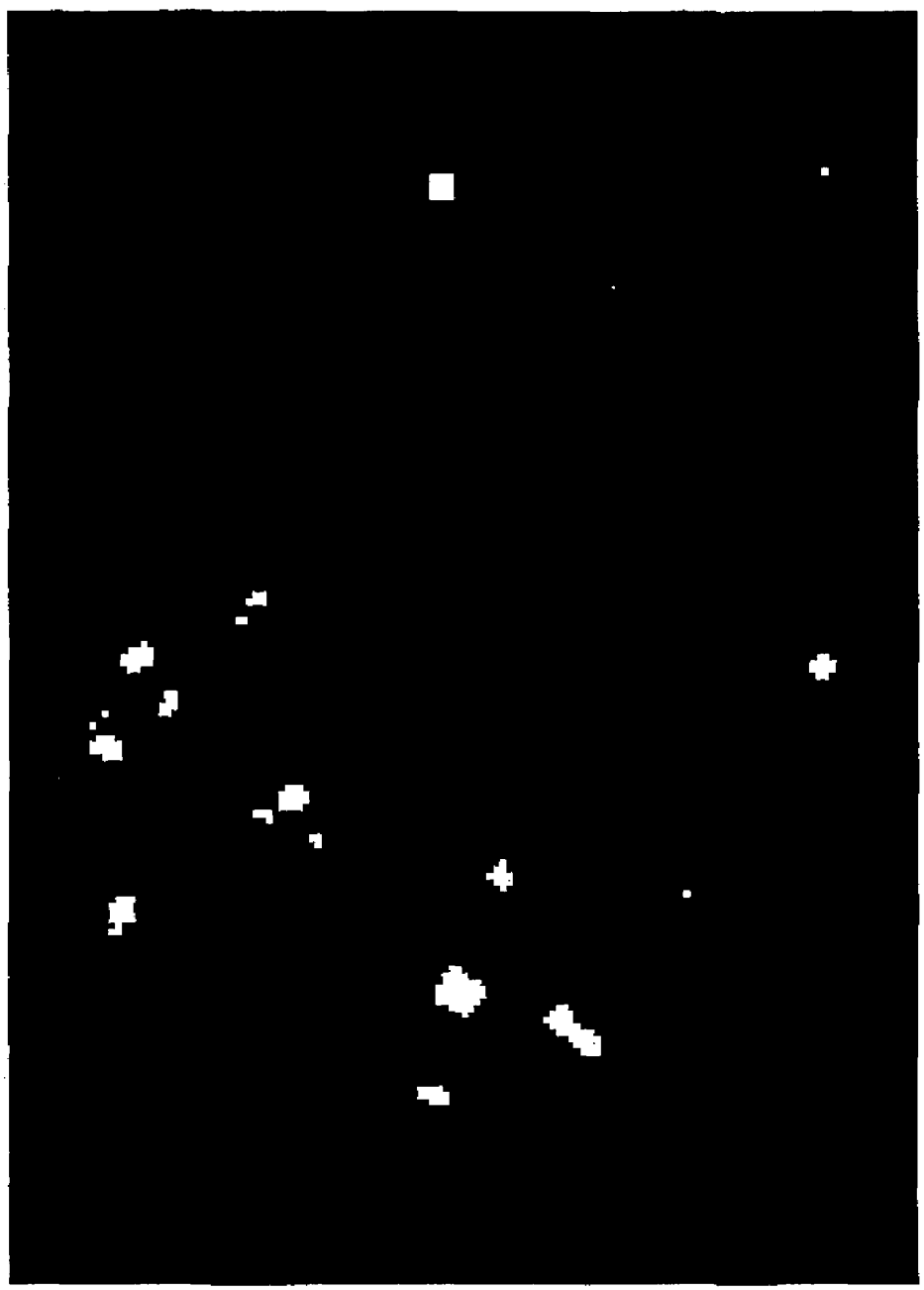
FIG. 5 shows the image T' which is the result of applying the Jackway Top Hat transform to image A'.

The result T' of the Top Hat transform of the down-sampled image A' of FIG. 3, is shown in FIG. 5. Parts of the landscape that penetrate the top hat are shown in white and those that did not are shown in black. A comparison of FIG. 5 with the input cell image in FIG. 2 shows that the location of some of the white areas of the Top Hat image correspond to the locations of objects-of-interest.

The next step in the scene segmentation process is to remove the white regions shown in FIG. 5 that do not correspond to objects-of-interest. This is achieved by eroding the image of FIG. 5. Morphological erosion is a preferred technique of removing pixels from regions of an image to make the regions uniformly smaller. A suitable process for binary morphological erosion by a factor $K_1$ is shown in the following pseudo-code:

```
Block: "Binary Erosion by factor K_1"
    Inputs: Image T', factor K_1
    Output: Image I'
    Algorithm:
    NewImage = Image T'
    FOR steps = 1 TO K_1
        OldImage = NewImage
        FOR each Pixel in NewImage
            Pixel NewImage_{X,Y} =
                MIN(OldImage_{X-1,Y-1}, OldImage_{X-1,Y},
                OldImage_{X-1,Y+1},
                    OldImage_{X,Y-1}, OldImage_{X,Y}, OldImage_{X,Y+1},
                    OldImage_{X+1,Y-1}, OldImage_{X+1,Y},
                    OldImage_{X+1,Y+1})
        ENDFOR
    ENDFOR
    RETURN Image I' = NewImage
```

Figure 6:
FIG. 6 shows the image I' which is the result of applying the morphological erosion to image T'.

The result of eroding the image of FIG. 5 is the image I' shown in FIG. 6. It can be seen that some of the small white regions of FIG. 5 have been removed completely, whilst the larger white regions have been made smaller. At this stage in the process, the aim is that every white region in FIG. 6 corresponds to a point within an object-of-interest in the input image of FIG. 2.

Using the image in FIG. 6, it is potentially possible to generate regions-of-interest by drawing a box of fixed size around each white region in FIG. 6. However, the method of the present invention uses a Watershed transform to obtain a better estimate of the regions-of-interest.

The Watershed transform requires two inputs. It requires a point within each object-of-interest, an inner marker, and a closed boundary outside each object-of-interest, an outer marker. The white regions in FIG. 6 serve as a good inner marker and the generation of a good outer marker, according to the present invention, is described in the following.

The image I' of FIG. 6 is used as a starting point for the generation of an outer marker. An operation known as binary reconstruction is used to re-grow the white regions T' of FIG. 5 from the white regions of I' of FIG. 6. However, only the white regions in FIG. 6 are used because these correspond to the objects-of-interest. The following pseudo-code demonstrates a suitable binary reconstruction method:

```
Block: "Binary Reconstruction"
    Inputs: Image T', Marker Image I'
    Output: Image R'
    Algorithm:
    FOR each Object in Image T'
        IF AND(Object_K, Marker I') ≠ 0
            Copy Object_K to Image R'
        ENDIF
    RETURN Image R'
```

Figure 7:
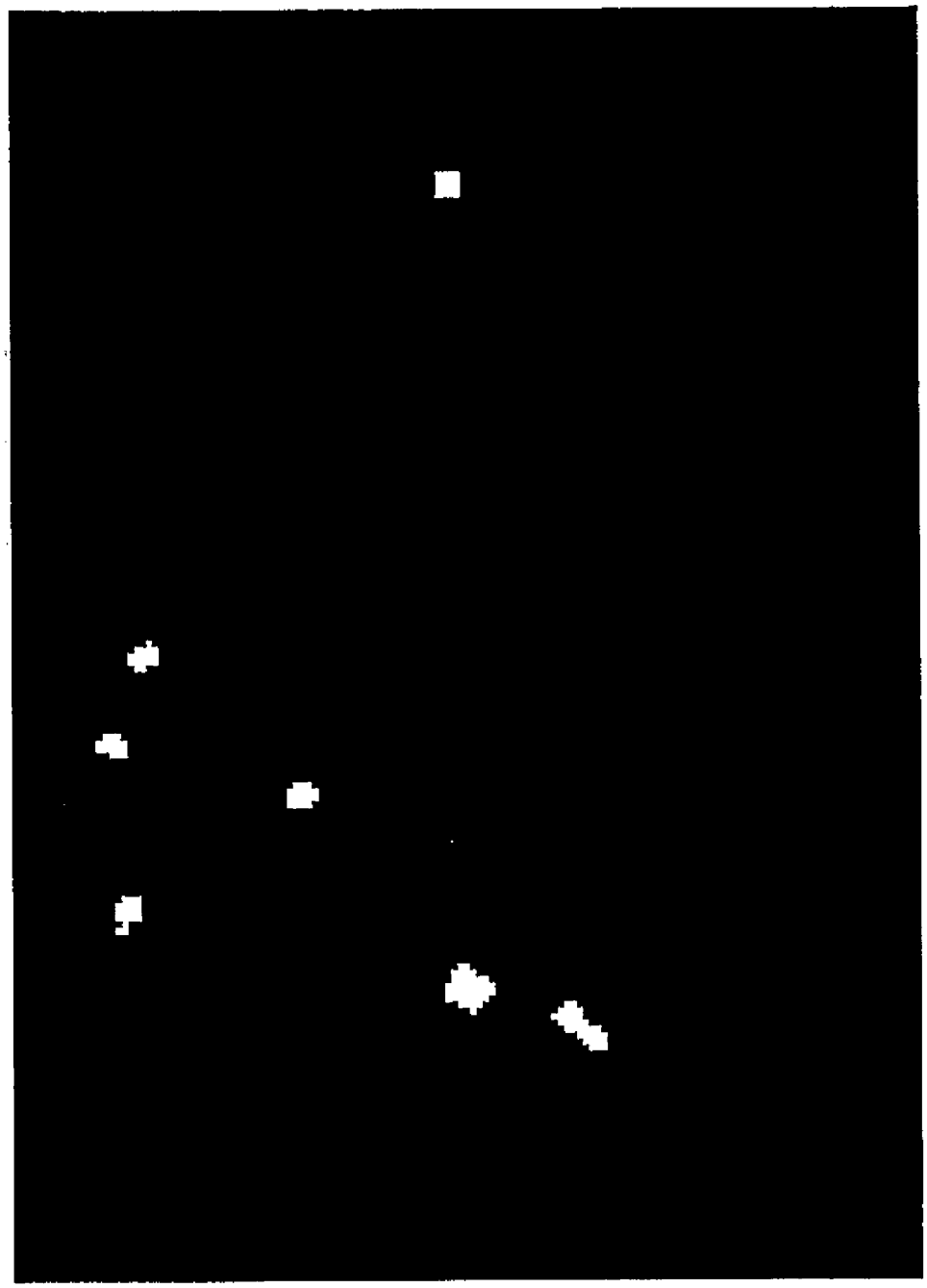
FIG. 7 shows the image R' which is the result of applying the binary reconstruction to the image T' using marker image I'.

The result of this operation is the image R' shown in FIG. 7. The reconstructed image R' of FIG. 7 is then dilated by a factor $K_2$ according to the following pseudo-code:

```
Block: "Binary Dilation by factor K_2"
    Inputs: Image R', factor K_2
    Output: Image M'
    Algorithm:
    NewImage = Image T'
    FOR steps = 1 TO K_2
        OldImage = NewImage
        FOR each Pixel in NewImage
            Pixel NewImage_{X,Y} =
                MAX(OldImage_{X-1,Y-1}, OldImage_{X-1,Y}, OldImage_{X-1,Y+1},
                    OldImage_{X,Y-1}, OldImage_{X,Y}, OldImage_{X,Y+1},
                    OldImage_{X+1,Y-1}, OldImage_{X+1,Y}, OldImage_{X+1,Y+1})
        ENDFOR
    ENDFOR
    RETURN Image M' = NewImage
```

Figure 8:
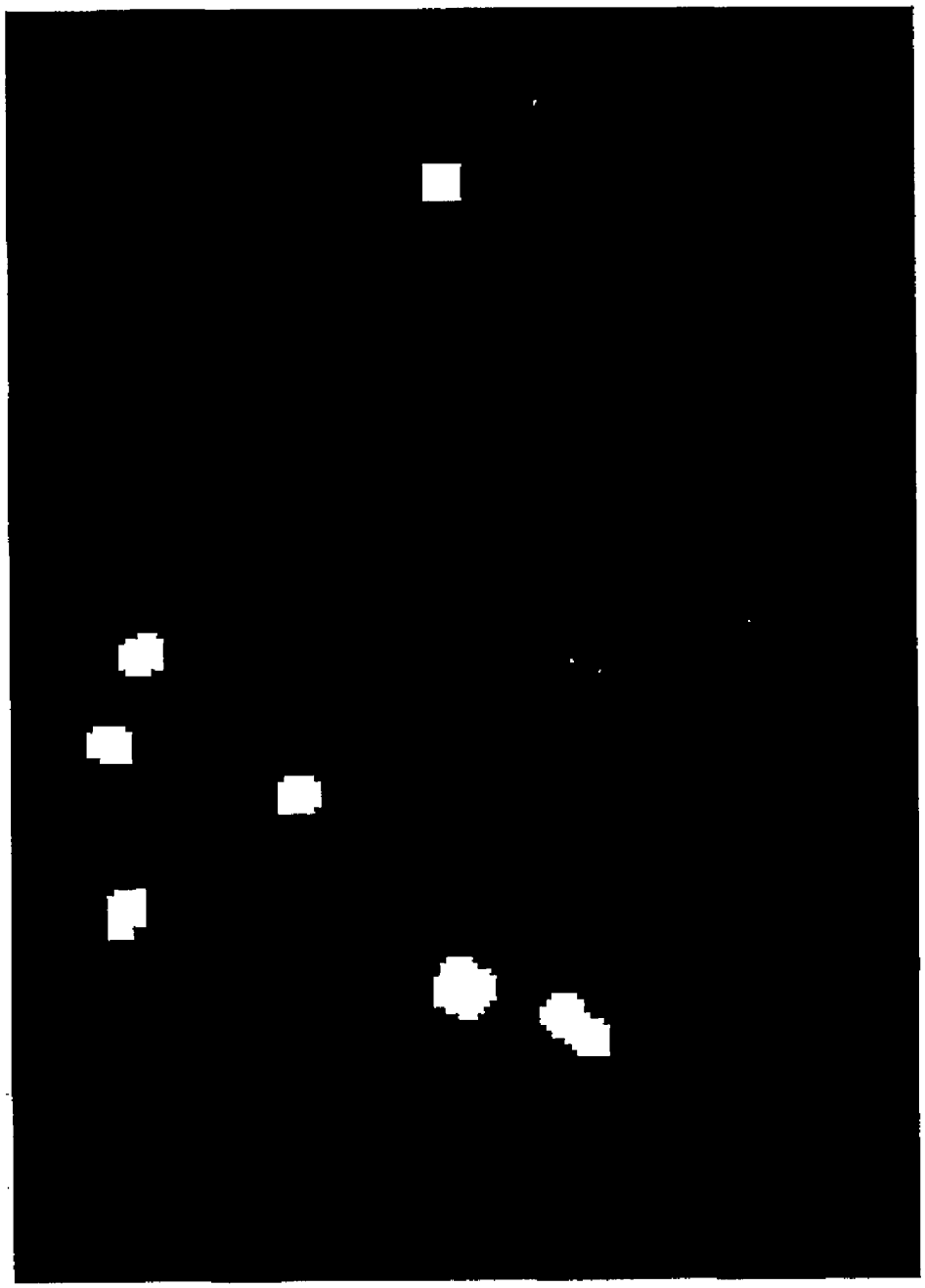
FIG. 8 shows the image M' which is the result of applying the morphological dilation to the image R'.

Morphological dilation is a preferred technique to produce the opposite effect of morphological erosion and, in this case, adds pixels to the white regions of FIG. 7. The result M' of dilation is shown in FIG. 8.

Although the dilation step could occur before binary reconstruction, it is computationally wasteful to do so, since additional calculations are made that are then discarded.

Figure 9:
FIG. 9 shows the inner marker image I which is the result of applying up-sampling to image I'.
Figure 10:
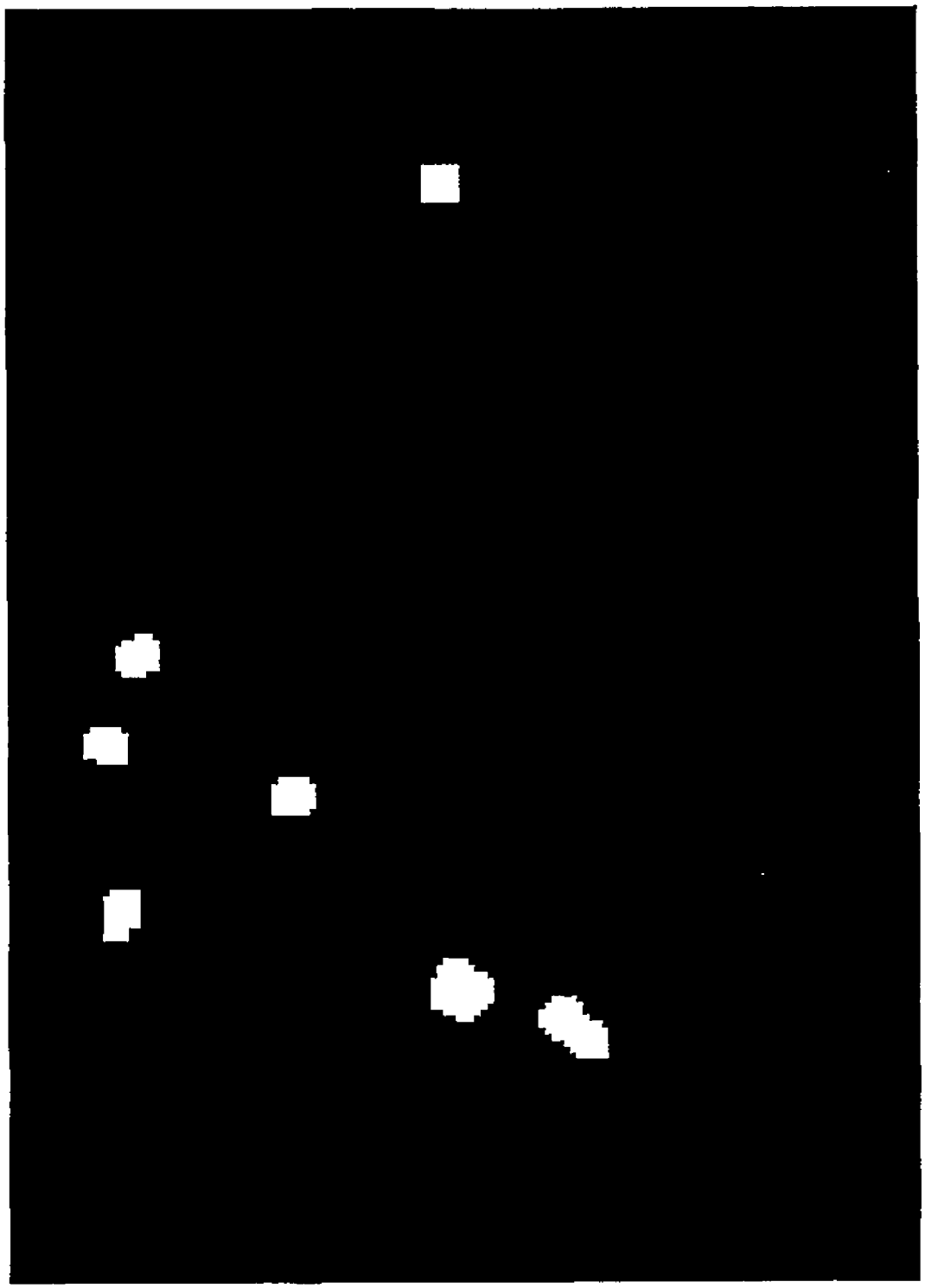
FIG. 10 shows the image M which is the result of applying up-sampling to image M'.

The final output from the Watershed transform must be at the original input image size and therefore the transform must be performed at the original input image size. Thus, the inputs for the transform are required to be at the original input image size. Consequently, the dilated image M' shown in FIG. 8 and the inner marker image I' shown in FIG. 6 are up-sampled to the original image size. The factor by which the images are up-sampled, N, is the same as the factor by which the original input image was down-sampled to reduce the original image. The inner marker image I is the result of up-sampling I', and is shown in FIG. 9. The result of up-sampling M' is the image M, which is shown in FIG. 10.

The following pseudo-code exemplifies up-sampling of the image I' to the image I. The same algorithm may be applied to up-sample M' to M.

```
Block: "Up Sample by factor N"
    Inputs: Image I', factor N
    Output: Image I
    Algorithm:
    NewImage = Image I'
    FOR steps = 1 TO N
        OldImage = NewImage
        NewImage = size(2*X_size(OldImage), 2*Y_size(OldImage))
        FOR each Pixel in OldImage
            Pixel NewImage_{2X,2Y} = OldImage_{X,Y}
            Pixel NewImage_{2X,2Y+1} = OldImage_{X,Y}
            Pixel NewImage_{2X+1,2Y} = OldImage_{X,Y}
            Pixel NewImage_{2X+1,2Y+1} = OldImage_{X,Y}
        ENDFOR
    ENDFOR
    RETURN Image I = NewImage
```

The outer marker required for the Watershed transform may be generated from the up-sampled dilated image by determining perimeters of the up-sampled white regions. The perimeters are shown in the image O in FIG. 11.

One way of performing perimeterisation is by looking at each black background pixel in the input image and if any of it's neighbours are white then the corresponding pixel in the perimeter image is turned to white. All other cases result in a black pixel in the perimeter image. The process is represented in the following pseudo-code:

```
Block: "Perimeter"
    Input: Image M
    Output: Image O
    Algorithm:
    FOR each Pixel in Image M
        IF Pixel M_{X,Y} = 0
            IF any Neighbour(Pixel M_{X,Y}) ≠ 0
                SET Pixel O_{X,Y} = 1
            ENDIF
        ENDIF
    RETURN Image O
```

Figure 11:
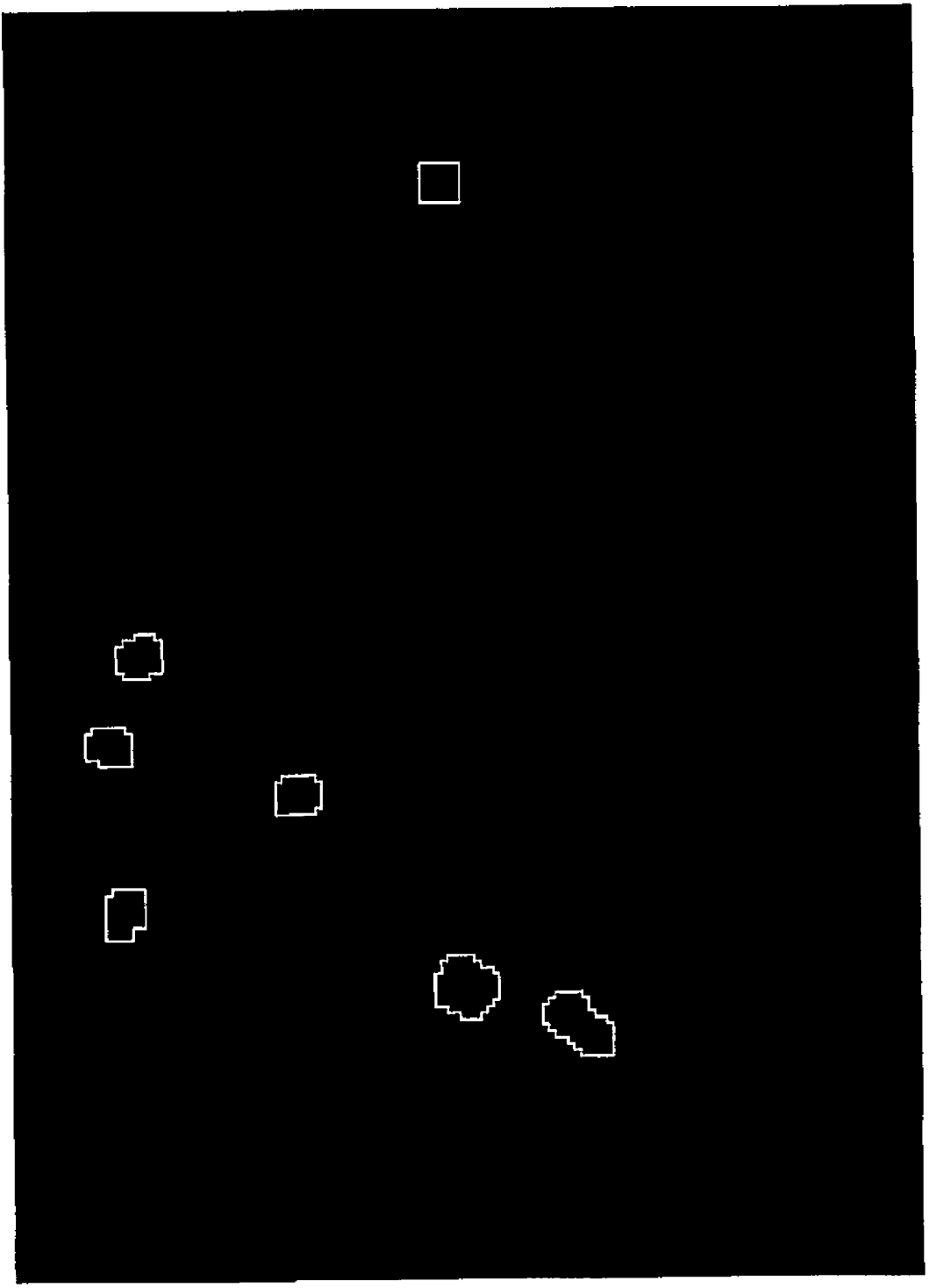
FIG. 11 shows the outer marker image O which is the result of applying the perimeter operation to image M.
Figure 12:
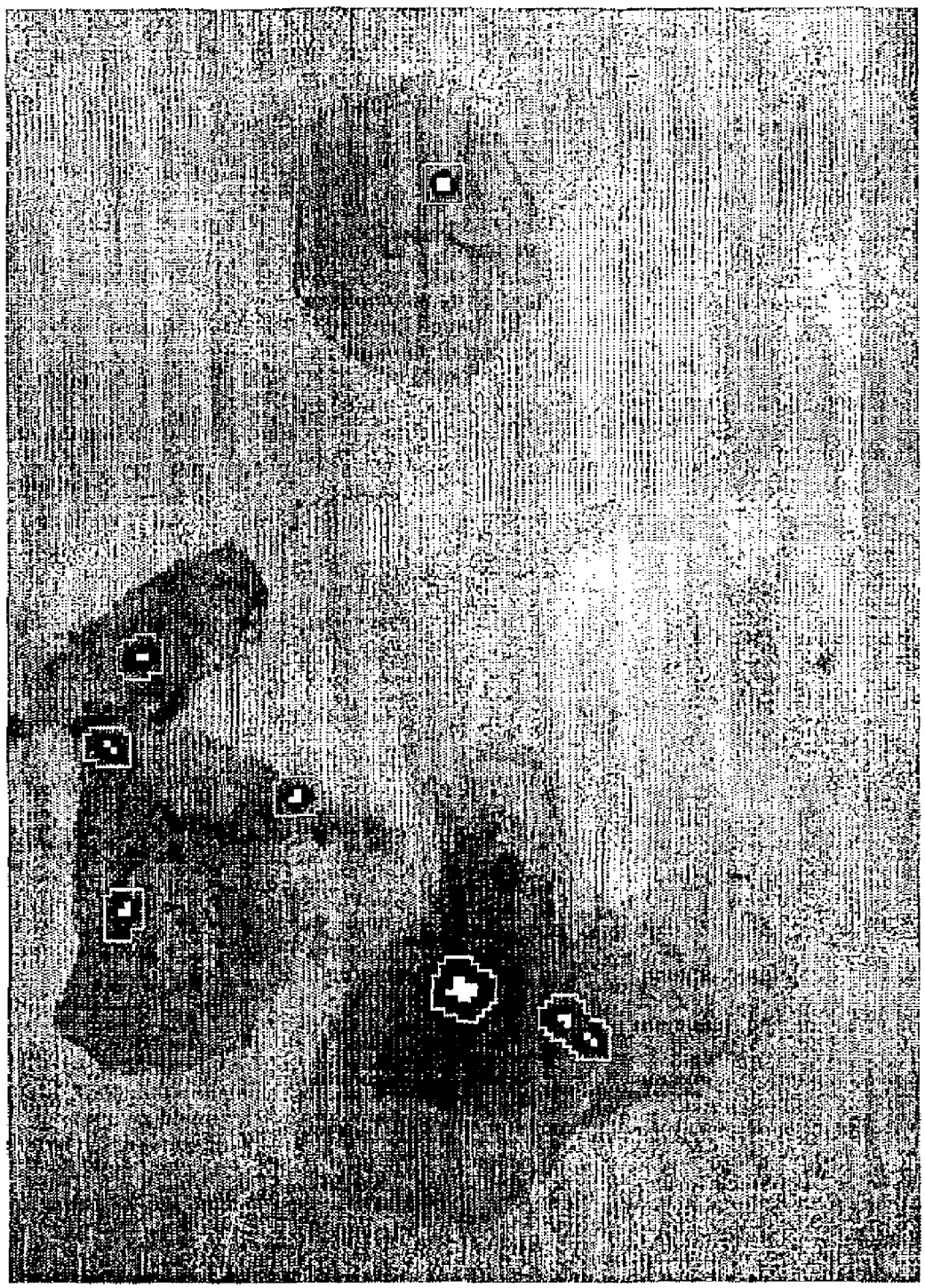
FIG. 12 shows the input image A, with inner marker image I, and outer marker image O, superimposed.

The result of the perimeterisation algorithm is the image O shown in FIG. 11. The positioning of the outer markers of FIG. 11 and the inner markers of FIG. 9, relative to the original input image of FIG. 2, is shown in FIG. 12.

Figure 13:
FIG. 13 shows the watershed transform image W of input image A with inner marker image I, and outer marker image O.
Figure 24:
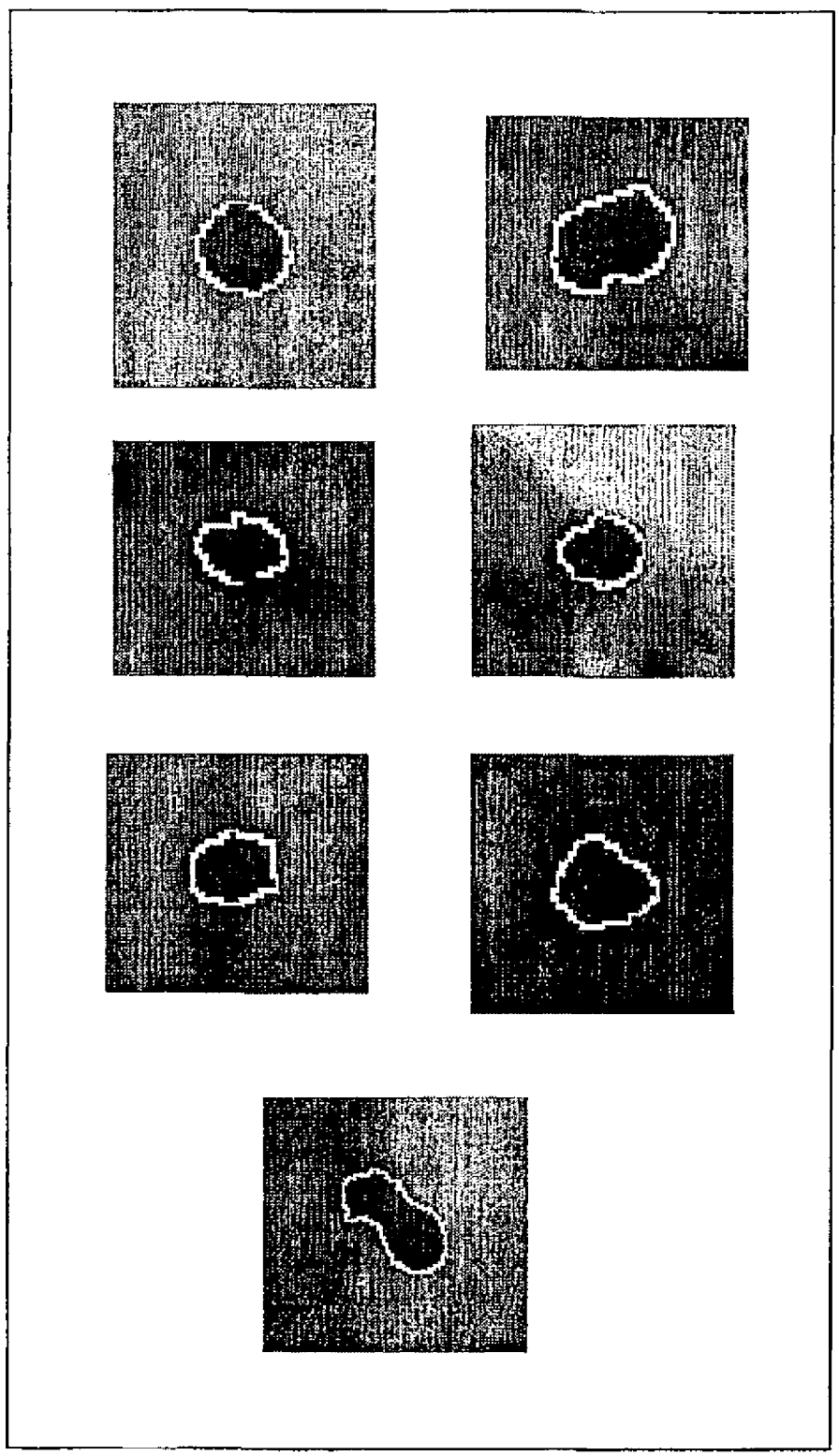

The next step in the process is to apply a Watershed algorithm such as is described by Beucher and Meyer in chapter 12, pages 433–482 of "Mathematical Morphology in Image Processing", published in New York by Marcel Dekker in 1993. The result of the Watershed transform using the generated inner and outer markers as inputs, is image W which is shown in FIG. 13. It can be seen that each object-of-interest has been delineated.

The final step in the process is to extract the required regions-of-interest, ROI. A bounding box is placed around each object-of-interest and the resulting final set of region-of-interest images, ROI, is shown in FIG. 14. The following algorithm is suitable for the process:

```
Block: "Object Extraction"
    Inputs: Image W, Border Size M
    Outputs: Regions of Interest Image ROI
    Algorithm:
    Xmin=1024
    Xmax=0
    Ymin=1024
    Ymax=0
    FOR each Object in Image W /* if any */
        FOR each Pixel_{X,Y} in Object_K
            Xmin = MIN(X, Xmin)
            Xmax = MAX(X, Xmax)
            Ymin = MIN(Y, Ymin)
            Ymax = MAX(Y, Ymax)
        ENDFOR
        Xmin = Xmin - M /* add M Pixel border all round*/
        Xmax = Xmax + M
        Ymin = Ymin - M
        Ymax = Ymax + M
        SET ROI = getImageRegion(W, Xmin, Xmax, Ymin, Ymax)
        OUTPUT Image ROI
    ENDFOR
```

These images may be used for further segmentation processing, such as for the second segmentation sub-task mentioned above.

Throughout the specification the aim has been to describe the preferred embodiment of the present invention without limiting the invention to any one embodiment or specific collection of features. Persons skilled in the relevant art may realize variations from the specific embodiments that will nonetheless fall within the scope of the invention.

The invention claimed is:

1. A method of scene segmentation comprising the steps of:
   (i) transforming an input image by a Top Hat operator;
   (ii) conducting erosion on said Top Hat transformed image to produce an inner marker image;
   (iii) eliminating objects less than an object-of-interest size by reconstructing said Top Hat transformed image with said inner marker image to produce a reconstructed image;
   (iv) conducting dilation on said reconstructed image to produce an outer marker image;
   (v) determining a perimeter of said outer marker image; and
   (vi) transforming said input image using said inner marker image and said perimeterised outer marker image by a Watershed operator to produce a segmented image of objects.

2. The method of claim 1 further comprising the step of delineating a region-of-interest around each object to produce region-of-interest images.

3. The method of claim 1 further comprising the preliminary step of down-sampling the input image by a factor to produce a smaller image.

4. The method of claim 1 further comprising the step of up-sampling the eroded and dilated images by a factor.

5. The method of claim 1 further comprising the steps of down-sampling the input image by a factor N to produce a smaller image and up-sampling the eroded and dilated images by a factor of M.

6. The method of claim 5 wherein the factors N and M are the same such that the inner and outer marker images are the same size as that of the input image.

7. The method of claim 1 wherein the Top Hat operator is of the form:

$$H=f-((f\oplus(B_{do}\backslash B_{di}))\ominus B_{di}),$$

where f is the original image, $B_{do}$ and $B_{di}$ are outer and inner structuring elements respectively, $\oplus$, $\ominus$ and $\backslash$ are standard morphological operators of dilation, erosion and set difference respectively.

8. The method of claim 1 wherein said erosion is morphological erosion.

9. The method of claim 1 wherein said dilation is morphological dilation.

* * * * *